(12) United States Patent
Contreras et al.

(10) Patent No.: US 8,553,506 B2
(45) Date of Patent: Oct. 8, 2013

(54) PREHEAT FEATURE FOR THERMALLY ASSISTED RECORDING

(75) Inventors: John Contreras, Palo Alto, CA (US);
Lidu Huang, Danville, CA (US);
Erhard Schreck, San Jose, CA (US);
Barry C. Stipe, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 0 days.

(21) Appl. No.: 13/340,147

(22) Filed: Dec. 29, 2011

(65) Prior Publication Data
US 2013/0170331 A1    Jul. 4, 2013

(51) Int. Cl.
*G11B 11/00* (2006.01)

(52) U.S. Cl.
USPC ................. 369/13.33; 369/13.13; 369/13.17

(58) Field of Classification Search
USPC .......... 369/13.02, 13.13, 13.32, 13.33, 13.14, 369/13.17; 360/59, 110
See application file for complete search history.

(56) References Cited

U.S. PATENT DOCUMENTS

| | | | | |
|---|---|---|---|---|
| 6,233,206 B1 * | 5/2001 | Hamann et al. | ............. | 369/13.01 |
| 6,307,832 B1 * | 10/2001 | Novotny et al. | ........... | 369/13.33 |
| 6,396,783 B1 * | 5/2002 | Bell et al. | ................... | 369/53.13 |
| 6,493,183 B1 | 12/2002 | Kasiraj et al. | | |
| 6,532,125 B1 * | 3/2003 | Hamann et al. | ................. | 360/59 |
| 6,702,186 B1 * | 3/2004 | Hamann et al. | ............. | 369/13.02 |
| 6,867,940 B2 | 3/2005 | Pleiss | | |
| 6,999,384 B2 | 2/2006 | Stancil et al. | | |
| 7,307,923 B2 | 12/2007 | Miyanishi et al. | | |
| 7,372,665 B1 * | 5/2008 | Stoev et al. | .............. | 360/125.33 |
| 7,375,914 B1 | 5/2008 | Dieron et al. | | |
| 7,430,090 B2 | 9/2008 | Oyamada et al. | | |
| 7,483,234 B2 | 1/2009 | Shimozato | | |
| 7,492,543 B2 | 2/2009 | Mitsunaga et al. | | |
| 7,515,372 B2 | 4/2009 | Erden et al. | | |
| 7,688,537 B2 | 3/2010 | Kiyono et al. | | |
| 7,835,104 B2 | 11/2010 | Yamashita et al. | | |
| 7,990,647 B2 | 8/2011 | Lille | | |
| 7,995,425 B2 * | 8/2011 | Schreck et al. | ............ | 369/13.13 |
| 2002/0101812 A1 * | 8/2002 | Wickramasinghe et al. | . | 369/126 |
| 2005/0057841 A1 * | 3/2005 | Stover et al. | .................... | 360/59 |
| 2007/0230021 A1 | 10/2007 | Schreck et al. | | |
| 2009/0027800 A1 | 1/2009 | Iwamoto et al. | | |
| 2009/0225464 A1 | 9/2009 | Juang et al. | | |
| 2009/0262608 A1 | 10/2009 | Kurita et al. | | |
| 2011/0096431 A1 * | 4/2011 | Hellwig et al. | ............... | 360/110 |
| 2012/0082015 A1 * | 4/2012 | Grobis et al. | .............. | 369/13.24 |

FOREIGN PATENT DOCUMENTS

| | | |
|---|---|---|
| JP | 2001/283402 A | 10/2001 |
| JP | 2005/078689 A | 3/2005 |
| JP | 2008/077751 A | 4/2008 |
| JP | 2008/310880 A | 12/2008 |
| JP | 2009/129489 A | 6/2009 |
| JP | 2009/295203 A | 12/2009 |
| JP | 2009/295205 A | 12/2009 |
| JP | 2011/065719 A | 3/2011 |

* cited by examiner

Primary Examiner — Thang Tran
(74) Attorney, Agent, or Firm — Zilka-Kotab, PC (57) ABSTRACT

An apparatus according to one embodiment includes a near-field transducer positioned towards an air bearing surface side of the apparatus; and at least one conductor or circuit for causing heating of the near-field transducer. A method according to one embodiment includes heating the near-field transducer by passing a current through the at least one conductor or circuit; and illuminating the near-field transducer during a write operation, wherein the current does not pass through the at least one conductor or circuit for at least a majority of a time of illumination. Additional embodiments are also presented.

24 Claims, 6 Drawing Sheets

PREHEAT FEATURE FOR THERMALLY ASSISTED RECORDING

FIELD OF THE INVENTION

The present invention relates to data storage systems, and more particularly, this invention relates to write heads with near-field transducers for thermally assisted recording.

BACKGROUND

The heart of a computer is a magnetic hard disk drive (HDD) which typically includes a rotating magnetic disk, a slider that has read and write heads, a suspension arm above the rotating disk and an actuator arm that swings the suspension arm to place the read and/or write heads over selected circular tracks on the rotating disk. The suspension arm biases the slider into contact with the surface of the disk when the disk is not rotating but, when the disk rotates, air is swirled by the rotating disk adjacent an air bearing surface (ABS) of the slider causing the slider to ride on an air bearing a slight distance from the surface of the rotating disk. When the slider rides on the air bearing the write and read heads are employed for writing magnetic impressions to and reading magnetic signal fields from the rotating disk. The read and write heads are connected to processing circuitry that operates according to a computer program to implement the writing and reading functions.

The ongoing quest for higher storage bit densities in magnetic media used in disk drives have reduced the size (volume) of data cells to the point where the cell dimensions are limited by the grain size of the magnetic material. Although grain size can be reduced further, there is concern that data stored within the cells is no longer thermally stable, as random thermal fluctuations at ambient temperatures are sufficient to erase data. This state is described as the superparamagnetic limit, which determines the maximum theoretical storage density for a given magnetic media. This limit may be raised by increasing the coercivity of the magnetic media or lowering the temperature. Lowering the temperature is not a practical option when designing hard disk drives for commercial and consumer use. Raising the coercivity is a practical solution, but requires write heads employing higher magnetic moment materials, or techniques such as perpendicular recording (or both).

One additional solution has been proposed, which employs heat to lower the effective coercivity of a localized region on the magnetic media surface and writes data within this heated region. The data state becomes "fixed" upon cooling the media to ambient temperatures. This technique is broadly referred to as "thermally assisted (magnetic) recording", TAR or TAMR. It can be applied to both longitudinal or perpendicular recording systems, although the highest density state of the art storage systems are more likely to be perpendicular recording systems. Heating of the media surface has been accomplished by a number of techniques such as focused laser beams or near-field optical sources.

U.S. Pat. No. 6,999,384 to Stancil et al., which is herein incorporated by reference, discloses near-field heating of a magnetic medium.

What is needed is a way to further improve TAR systems.

SUMMARY

An apparatus according to one embodiment includes a near-field transducer positioned towards an air bearing surface side of the apparatus; and at least one conductor or circuit for causing heating of the near-field transducer.

A method according to one embodiment includes heating the near-field transducer by passing a current through the at least one conductor or circuit; and illuminating the near-field transducer during a write operation, wherein the current does not pass through the at least one conductor or circuit for at least a majority of a time of illumination.

Any of these embodiments may be implemented in a magnetic data storage system such as a disk drive system, which may include a magnetic head, a drive mechanism for passing a magnetic medium (e.g., hard disk) over the magnetic head, and a controller electrically coupled to the magnetic head.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified.

The following description discloses several preferred embodiments of disk-based storage systems and/or related systems and methods, as well as operation and/or component parts thereof.

In one general embodiment, an apparatus includes a near-field transducer positioned towards an air bearing surface side of the apparatus; and at least one conductor or circuit for causing heating of the near-field transducer.

In another general embodiment, a method includes heating the near-field transducer by passing a current through the at least one conductor or circuit; and illuminating the near-field transducer during a write operation, wherein the current does not pass through the at least one conductor or circuit for at least a majority of a time of illumination.

Figure 1:
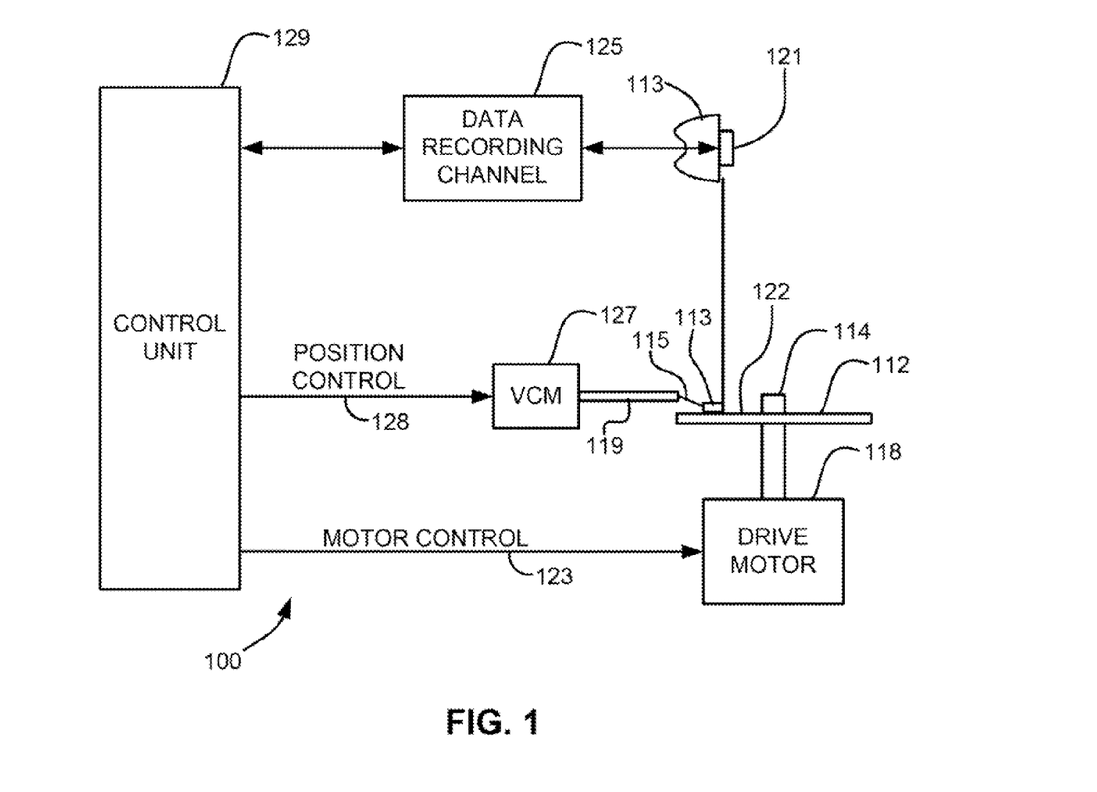
FIG. 1 shows a simplified drawing of a magnetic recording disk drive system.

Referring now to FIG. 1, there is shown a disk drive 100 in accordance with one embodiment of the present invention. As shown in FIG. 1, at least one rotatable magnetic disk 112 is supported on a spindle 114 and rotated by a disk drive motor 118. The magnetic recording on each disk is typically in the form of an annular pattern of concentric data tracks (not shown) on the disk 112.

At least one slider 113 is positioned near the disk 112, each slider 113 supporting one or more magnetic read/write heads 121. As the disk rotates, slider 113 is moved radially in and out over disk surface 122 so that heads 121 may access different tracks of the disk where desired data are recorded and/or to be written. Each slider 113 is attached to an actuator arm 119 by means of a suspension 115. The suspension 115 provides a slight spring force which biases slider 113 against the disk surface 122. Each actuator arm 119 is attached to an actuator 127. The actuator 127 as shown in FIG. 1 may be a voice coil motor (VCM). The VCM includes a coil movable within a fixed magnetic field, the direction and speed of the coil movements being controlled by the motor current signals supplied by controller 129.

During operation of the disk storage system, the rotation of disk 112 generates an air bearing between slider 113 and disk surface 122 which exerts an upward force or lift on the slider. The air bearing thus counter-balances the slight spring force of suspension 115 and supports slider 113 off and slightly above the disk surface by a small, substantially constant spacing during normal operation. Note that in some embodiments, the slider 113 may slide along the disk surface 122.

The various components of the disk storage system are controlled in operation by control signals generated by control unit 129, such as access control signals and internal clock signals. Typically, control unit 129 includes logic control circuits, storage (e.g., memory), and a microprocessor. The control unit 129 generates control signals to control various system operations such as drive motor control signals on line 123 and head position and seek control signals on line 128. The control signals on line 128 provide the desired current profiles to optimally move and position slider 113 to the desired data track on disk 112. Read and write signals are communicated to and from read/write heads 121 by way of recording channel 125.

The above description of a typical magnetic disk storage system, and the accompanying illustration of FIG. 1 is for representation purposes only. It should be apparent that disk storage systems may contain a large number of disks and actuators, and each actuator may support a number of sliders.

An interface may also be provided for communication between the disk drive and a host (integral or external) to send and receive the data and for controlling the operation of the disk drive and communicating the status of the disk drive to the host, all as will be understood by those of skill in the art.

In a typical head, an inductive write head includes a coil layer embedded in one or more insulation layers (insulation stack), the insulation stack being located between first and second pole piece layers. A gap is formed between the first and second pole piece layers by a gap layer at an air bearing surface (ABS) of the write head. The pole piece layers may be connected at a back gap. Currents are conducted through the coil layer, which produce magnetic fields in the pole pieces. The magnetic fields fringe across the gap at the ABS for the purpose of writing bits of magnetic field information in tracks on moving media, such as in circular tracks on a rotating magnetic disk.

The second pole piece layer has a pole tip portion which extends from the ABS to a flare point and a yoke portion which extends from the flare point to the back gap. The flare point is where the second pole piece begins to widen (flare) to form the yoke. The placement of the flare point directly affects the magnitude of the magnetic field produced to write information on the recording medium.

Figure 2A:
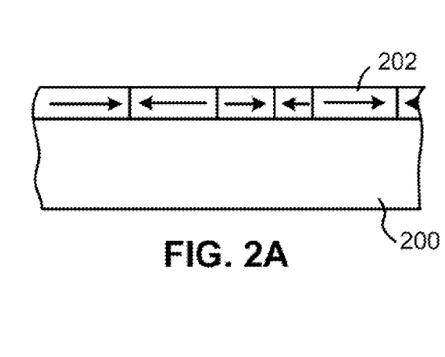
FIG. 2A shows a schematic representation in section of a recording medium utilizing a longitudinal recording format.

FIG. 2A illustrates, schematically, a conventional recording medium such as used with magnetic disc recording systems, such as that shown in FIG. 1. This medium is utilized for recording magnetic impulses in or parallel to the plane of the medium itself. The recording medium, a recording disc in this instance, includes basically a supporting substrate 200 of a suitable non-magnetic material such as glass, with an overlying coating 202 of a suitable and conventional magnetic layer.

Figure 2B:
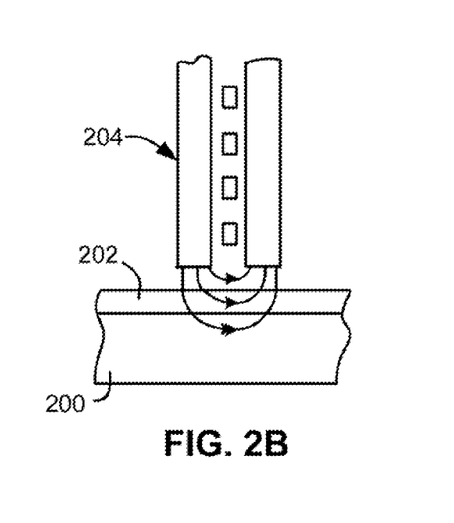
FIG. 2B shows a schematic representation of a conventional magnetic recording head and recording medium combination for longitudinal recording as in FIG. 2A.

FIG. 2B shows the operative relationship between a conventional recording/playback head 204, which may preferably be a thin film head, and a conventional recording medium, such as that of FIG. 2A.

Figure 2C:
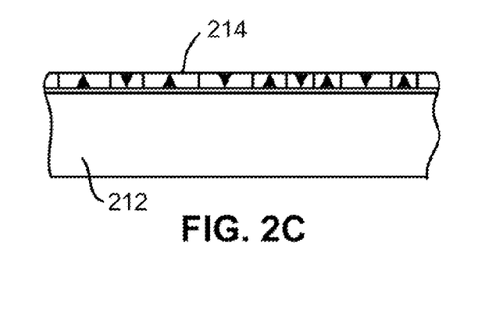
FIG. 2C shows a magnetic recording medium utilizing a perpendicular recording format.

FIG. 2C illustrates, schematically, the orientation of magnetic impulses substantially perpendicular to the surface of a recording medium as used with magnetic disc recording systems, such as that shown in FIG. 1. For such perpendicular recording the medium typically includes an under layer 212 of a material having a high magnetic permeability. This under layer 212 is then provided with an overlying coating 214 of magnetic material preferably having a high coercivity relative to the under layer 212.

Figure 2D:
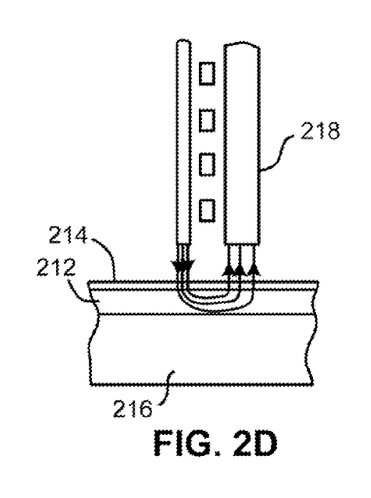
FIG. 2D shows a schematic representation of a recording head and recording medium combination for perpendicular recording on one side.

FIG. 2D illustrates the operative relationship between a perpendicular head 218 and a recording medium. The recording medium illustrated in FIG. 2D includes both the high permeability under layer 212 and the overlying coating 214 of magnetic material described with respect to FIG. 2C above. However, both of these layers 212 and 214 are shown applied to a suitable substrate 216. Typically there is also an additional layer (not shown) called an "exchange-break" layer or "interlayer" between layers 212 and 214.

In this structure, the magnetic lines of flux extending between the poles of the perpendicular head 218 loop into and out of the overlying coating 214 of the recording medium with the high permeability under layer 212 of the recording medium causing the lines of flux to pass through the overlying coating 214 in a direction generally perpendicular to the surface of the medium to record information in the overlying coating 214 of magnetic material preferably having a high coercivity relative to the under layer 212 in the form of magnetic impulses having their axes of magnetization substantially perpendicular to the surface of the medium. The flux is channeled by the soft underlying coating 212 back to the return layer (P1) of the head 218.

Figure 2E:
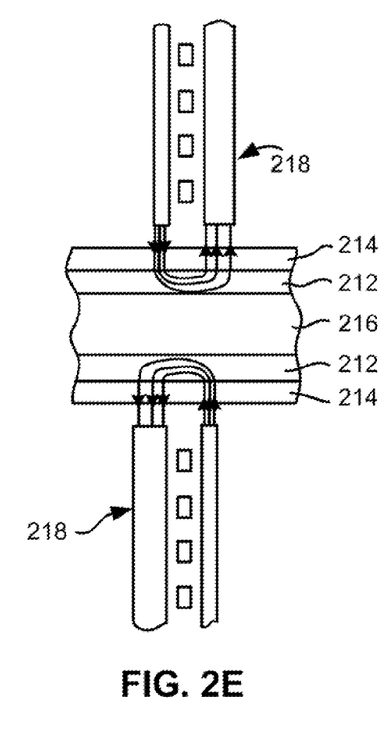
FIG. 2E shows a schematic representation of a recording apparatus adapted for recording separately on both sides of the medium.

FIG. 2E illustrates a similar structure in which the substrate 216 carries the layers 212 and 214 on each of its two opposed sides, with suitable recording heads 218 positioned adjacent the outer surface of the magnetic coating 214 on each side of the medium, allowing for recording on each side of the medium.

Figure 3A:
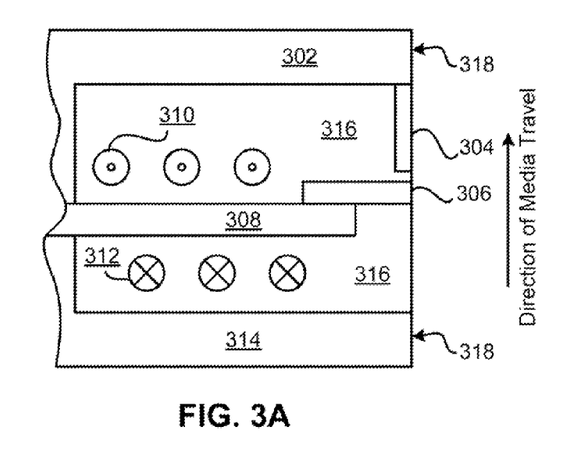
FIG. 3A shows a cross-sectional view of one particular embodiment of a perpendicular magnetic head with helical coils.

FIG. 3A is a cross-sectional view of a perpendicular magnetic head. In FIG. 3A, helical coils 310 and 312 are used to create magnetic flux in the stitch pole 308, which then delivers that flux to the main pole 306. Coils 310 indicate coils extending out from the page, while coils 312 indicate coils extending into the page. Stitch pole 308 may be recessed from the ABS 318. Insulation 316 surrounds the coils and may provide support for some of the elements. The direction of the media travel, as indicated by the arrow to the right of the structure, moves the media past the lower return pole 314 first, then past the stitch pole 308, main pole 306, trailing shield 304 which may be connected to the wrap around shield (not shown), and finally past the upper return pole 302. Each of these components may have a portion in contact with the ABS 318. The ABS 318 is indicated across the right side of the structure.

Perpendicular writing is achieved by forcing flux through the stitch pole 308 into the main pole 306 and then to the surface of the disk positioned towards the ABS 318.

Figure 3B:
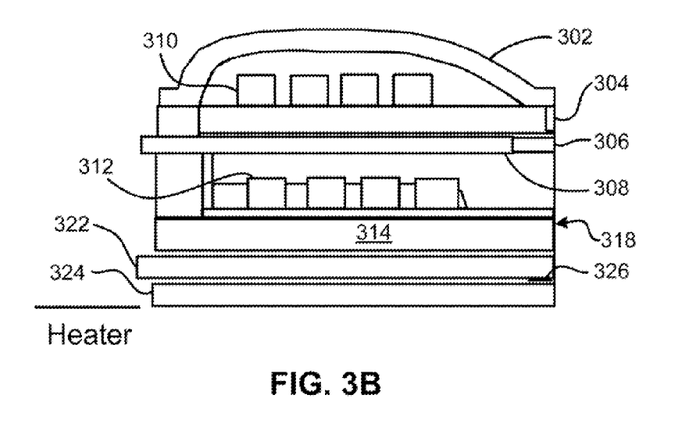
FIG. 3B shows a cross-sectional view of one particular embodiment of a piggyback magnetic head with helical coils.

FIG. 3B illustrates a piggyback magnetic head having similar features to the head of FIG. 3A. Two shields 304, 314 flank the stitch pole 308 and main pole 306. Also sensor shields 322, 324 are shown. The sensor 326 is typically positioned between the sensor shields 322, 324.

Figure 4A:
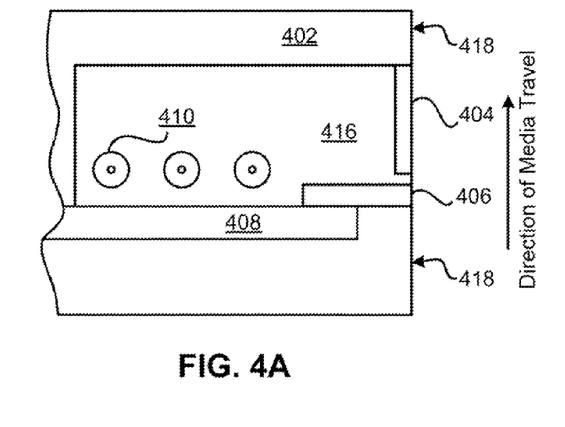
FIG. 4A shows a cross-sectional view of one particular embodiment of a perpendicular magnetic head with looped coils.

FIG. 4A is a schematic diagram of one embodiment which uses looped coils 410, sometimes referred to as a pancake configuration, to provide flux to the stitch pole 408. The stitch pole then provides this flux to the main pole 406. In this orientation, the lower return pole is optional. Insulation 416 surrounds the coils 410, and may provide support for the stitch pole 408 and main pole 406. The stitch pole may be recessed from the ABS 418. The direction of the media travel, as indicated by the arrow to the right of the structure, moves the media past the stitch pole 408, main pole 406, trailing shield 404 which may be connected to the wrap around shield (not shown), and finally past the upper return pole 402 (all of which may or may not have a portion in contact with the ABS 418). The ABS 418 is indicated across the right side of the structure. The trailing shield 404 may be in contact with the main pole 406 in some embodiments.

Figure 4B:
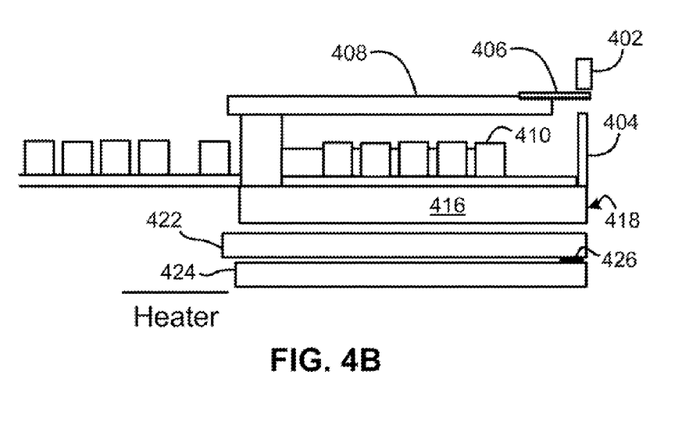
FIG. 4B shows a cross-sectional view of one particular embodiment of a piggyback magnetic head with looped coils.

FIG. 4B illustrates another type of piggyback magnetic head having similar features to the head of FIG. 4A including a looped coil 410, which wraps around to form a pancake coil. Also, sensor shields 422, 424 are shown. The sensor 426 is typically positioned between the sensor shields 422, 424.

In FIGS. 3B and 4B, an optional heater is shown near the non-ABS side of the magnetic head. A heater (Heater) may also be included in the magnetic heads shown in FIGS. 3A and 4A. The position of this heater may vary based on design parameters such as where the protrusion is desired, coefficients of thermal expansion of the surrounding layers, etc.

According to some embodiments, for TAR to be realized, it may be beneficial to confine heat to about a single data track (an exemplary data track may be approximately 40 nm wide or smaller) with high efficiency. Candidate near-field transducers typically use a low-loss metal (Au, Ag, Al, Cu, etc.) shaped in such a way as to concentrate surface charge motion at a tip or apex located at the slider ABS when light is incident. Oscillating tip charge may create an intense near-field pattern, heating the disk. Sometimes, the metal structure can create resonant charge motion (surface plasmons) to further increase intensity and disk heating. For example, when polarized light is aligned with the corner of a triangular-shaped gold plate, an intense near-field pattern may be created at that corner. Resonant charge motion may occur by adjusting the transducer size to match a surface plasmon frequency to the incident light frequency. Another near-field transducer is the ridge slot waveguide from microwave circuits applied to optical frequencies (also known as the C or E aperture). This shape may be characterized by five parameters including the metal thickness. Light polarization may be aligned with the ridge and incident light may concentrate surface charge at the tip of the ridge.

A magnetic head flies close to the magnetic medium in part, to improve efficiency as well as the writing quality. However, when a laser light is activated and dissipates energy on a near field transducer such as a plasmon antenna to initiate the write process, the plasmon antenna protrudes at very high speeds. The plasmon antenna can actually protrude about 100 times faster than the Thermal Fly-height Control (TFC) is able to retract the head. Without wishing to be bound by any theory, it is believed that if this mismatch is not somehow compensated, the write process must begin with a much larger spacing between the head and the medium to compensate for this protrusion. However, it is also believed that this initial added separation in anticipation of the protrusion would lead to poor initial write quality because the separation is too large to accurately write. It is not until the protrusion occurs after the writing has already started that the antenna is lowered to an ideal writing position.

According to one embodiment, heating such as electrical Joule heating may be implemented to preheat the near field transducer so a protrusion is already established when the writing begins. In various approaches, a near field transducer may be any type known in the art, or any which would be apparent to one skilled in the art upon reading the present description. This added electrical Joule heating reduces the initial poor writing quality while only requiring a few milliwatts, thereby not significantly impacting the heating and/or power required for the system.

The electrical Joule heating also allows for protrusion to the nominal spacing between the medium and the near field transducer without interfering with the magnetic medium below. This non-magnetic design is desirable in that it does not accidentally erase important data and/or write unwanted data to the medium. Therefore, nominal spacing may be maintained before, during, after, between, etc. writing periods without the possibility of accidental changes to the data.

Figure 5:
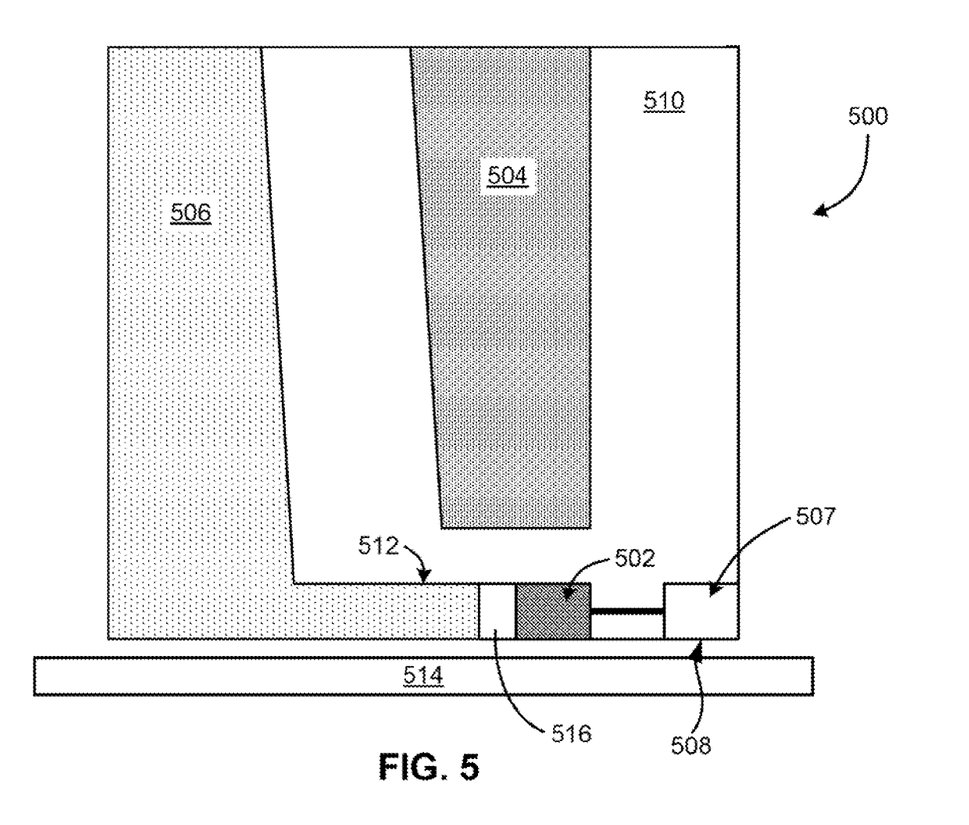
FIG. 5 depicts a partial cross-sectional view of a thermally assisted apparatus according to one embodiment.

Now referring to FIG. 5, a partial cross section view of a thermally assisted apparatus 500 is shown according to one embodiment. Of course, this embodiment may be used in conjunction with any structures and systems described in any of the other figures. In order to simplify and clarify the structures presented, spacing layers, insulating layers, and write coil layers may be omitted from the subsequent figures and descriptions.

The apparatus 500 of FIG. 5 includes a near-field transducer 502 e.g., of a type known in the art, positioned towards an air bearing surface 508 side of a structure such as a magnetic head of a slider. In another approach, the apparatus 500 may include a magnetic head e.g., of a type known in the art, having the near-field transducer and a magnetic medium. In one approach, a waveguide may be included for illumination of the near-field transducer.

The system 500 may include a magnetic recording medium 514, and in some approaches having a magnetic layer with features in a discrete track configuration or a bit patterned configuration. The discrete track configuration or a bit patterned configuration is not shown in the figure for sake of clarity. In one approach, the magnetic medium may be a magnetic tape, a magnetic disk, etc.

The system 500 may also include a writer (magnetic pole) 506 for writing to the magnetic medium 514, and the near-field transducer 502 may be preferably used for heating the magnetic medium 514 for TAR.

According to some approaches, the system may include an optical waveguide (504 & 510) for illuminating the near-field transducer 502. The waveguide core 504 may additionally be a recessed dielectric waveguide and may be integrated with the near-field transducer 502 for achieving TAR.

In one approach, the optical waveguide core 504 may be comprised of any suitable material as is known to one of skill in the art, such as $Ta_2O_5$, $TiO_2$, etc. In another approach, the waveguide cladding 510 may be comprised of any suitable material as is known to one of skill in the art, such as $Al_2O_3$, $SiO_2$, etc. Moreover, a dielectric layer 516 may be positioned in the gap between the magnetic lip 512 and the near-field transducer 502. In one approach, the dielectric layer 516 may be comprised of any suitable material as is known to one of skill in the art, such as $Al_2O_3$, $SiO_2$, $Ta_2O_5$, etc.

In one approach, the magnetic medium may include a magnetic tape, a magnetic disk, etc. or any other magnetic medium which would be apparent to one of skill in the art upon reading the present description. The apparatus may additionally include a drive mechanism e.g., of a type known in the art, for passing the magnetic medium over the magnetic head. Furthermore, the apparatus may also incorporate a controller e.g., of a type known in the art electrically coupled to the magnetic head for controlling operation of the magnetic head. In one approach, the electric controller may be electrically coupled to the magnetic head with a wire, wirelessly, etc. or any other electrically coupling configuration which would be apparent to one of skill in the art upon reading the present description.

With continued reference to FIG. 5, the apparatus 500 may additionally include at least one conductor or circuit 507 for causing heating of the near-field transducer 502. In one approach, the at least one conductor or circuit may be coupled to the near field transducer by attaching two leads to the near field transducer, or by attaching one lead to the near field transducer and grounding the near field transducer.

In one approach, the at least one conductor or circuit 507 may include an electrical conductor coupled to the near-field transducer for inducing Joule heating therein. Because the same structure heated by dissipation of light energy is now additionally being preheated with Joule heating, the dynamic extension behavior is very similar. This added preheat may be used to establish a protrusion amount about similar to the protrusion generated by the plasmon antenna during actual TAR writing. Moreover, joule heating may be generated in the near-field transducer when a current is passed through the electrical conductor. For approaches where the current is applied directly to the antenna, an additional pad in conjunction with an extra lead may be implemented to deliver the current.

Figure 6:
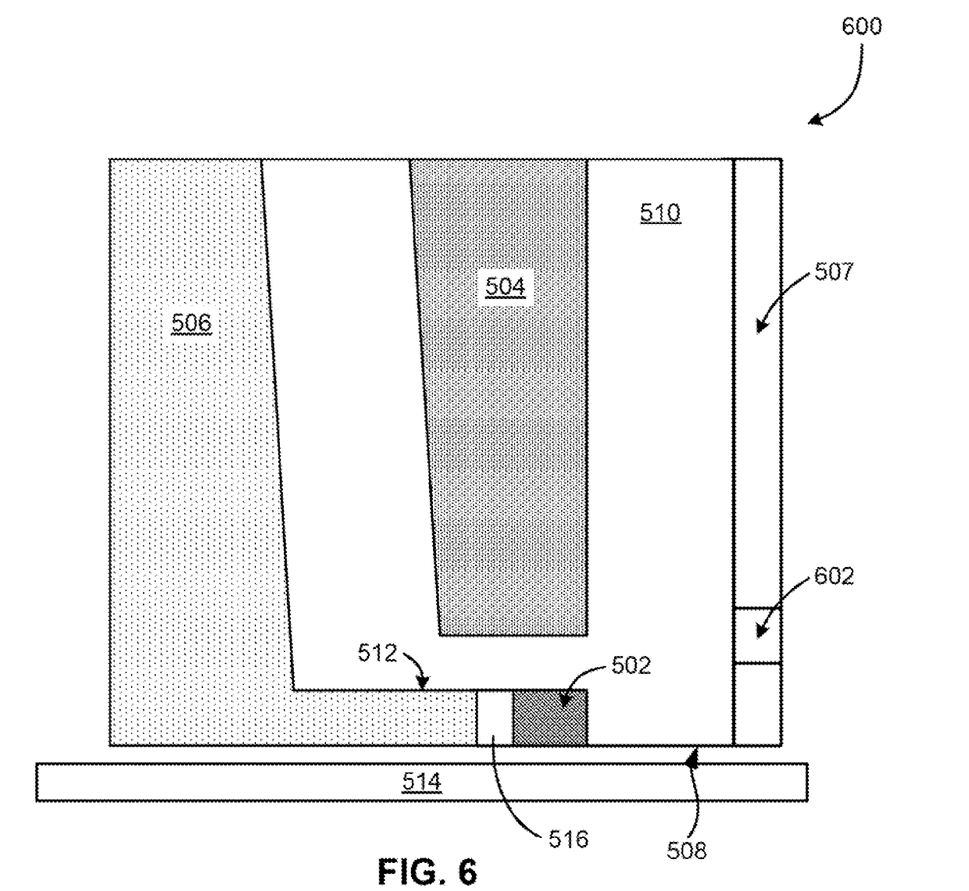
FIG. 6 depicts a partial cross-sectional view of a thermally assisted apparatus according to one embodiment.

Referring to FIG. 6, the at least one conductor or circuit 507 may include a heating element 602 positioned closer than about 400 nm to the near-field transducer 502, preferably between about 100 and about 400 nm, but could be closer or farther depending on the particular design. In one approach, a previously designed and implemented contact sensor may serve as a viable platform to integrate a heating device.

In one design, the heating element may be recessed from the air bearing surface side, which may require a slightly higher current to compensate for the additional separation between the antenna and the medium than a non-recessed heating element. Without wishing to be bound by any theory, it is believed that the deeper the heating element is recessed, the longer the corresponding time constants may become. In one embodiment, the heating element may be recessed from the ABS by less than about 1.5 micrometers, more preferably less than about 1 micrometer, more preferably less than about 0.5 micrometers, but could be higher or lower based on the design.

In various approaches, the current may be direct current (DC), alternating current (AC), etc. Regarding approaches which may incorporate AC, a frequency period, e.g., the time to complete one wave cycle, of the AC may preferably be faster than a thermal expansion time constant of the near-field transducer, but may be slower based on the design. The thermal expansion time constant represents the time it takes before a material physically reacts, e.g., expands, contract, etc. to a change in temperature.

In a preferred approach, the frequency of the AC may be about 5 times, preferably 7 times, still more preferably 10 times higher than that of the protrusion. Without wishing to be bound by any theory, it is believed that this preferred embodiment may allow the protrusion to remain at a static position due to the much higher frequency. It is believed that the higher frequency of the AC allows the current to repeatedly reach its peak value (the calculated value required to induce the optimal protrusion) fast enough to negate the thermal expansion time constant. On the other hand, if the frequency of the AC was closer to, or lower than the thermal expansion time constant, the period of the current (the amount of time between peak wave values) would be closer to being the same as, or slower than the thermal expansion time constant. It is believed that this would actually allow the protrusion to retract and then re-protrude between every cycle of the current, which would be highly unfavorable. This would result in very poor writing quality as the near field transducer would constantly be moving great distances toward and away from the medium. As explained above, thermal expansion time constant is about 100 times faster than the TFC is able to retract the head, so there would be no way compensate for this very rapid repeating protrusion and retraction. Such repeating protrusions and retractions may also cause unfavorable strain on the antenna and/or head, sway in the fly arm due to the repeated motion, etc.

Moreover, a voltage at the near-field transducer may be less than about 2V, preferably less than about 1.5V, still more preferably less than about 1V, but could be more or less depending on the approach. In a preferred embodiment, the voltage at the near-field transducer may be as small as possible. In various approaches, the controller may include, but is not limited to one known in the art, or a controller which would be apparent to one skilled in the art upon reading the present description.

Without wishing to be bound by any theory, it is believed that due to the small gap between the head and the medium, a voltage of as low as 1V can create a very large electric field. Moreover, this electric field may cause a variety of potentially harmful situations such as electron discharge, electrochemistry, etc. due to the presence of lubricants, water film, etc. on or near the head. It is believed that in a preferred embodiment, if an AC were implemented with a higher frequency as discussed herein, some of these potentially harmful situations may be canceled and/or reversed. It is also believed that current with differing polarities may be applied in various embodiments in an attempt to improve and more preferably prevent these potentially harmful situations.

In one embodiment, a controller may be included for applying the current to the at least one conductor or circuit. In an attempt to maintain about a constant thermally induced expansion of the near-field transducer, the controller may be configured in a number of ways. In one approach, the controller may be configured to apply the current for all the time that the near-field transducer is not illuminated. However, applying the current for the whole time the near-field transducer is not illuminated requires a constant power supply, and brings the head closer to the medium which is always a risk. Therefore, it is more preferable to allow the protrusion to retract when writing is not imminent thereby reducing power consumption and flying at a higher and safer distance from the medium. In a preferred approach, the controller may be configured to apply the current to the at least one conductor or circuit for at least a majority of the time that the near-field transducer is not illuminated.

In another approach, the controller may be configured to apply the current to the at least one conductor or circuit for a portion of the time that the near-field transducer is illuminated. The controller may further be configured to apply the current to the at least one conductor or circuit when a servo pattern on a magnetic medium passes by the near-field transducer according to one approach.

Figure 7:
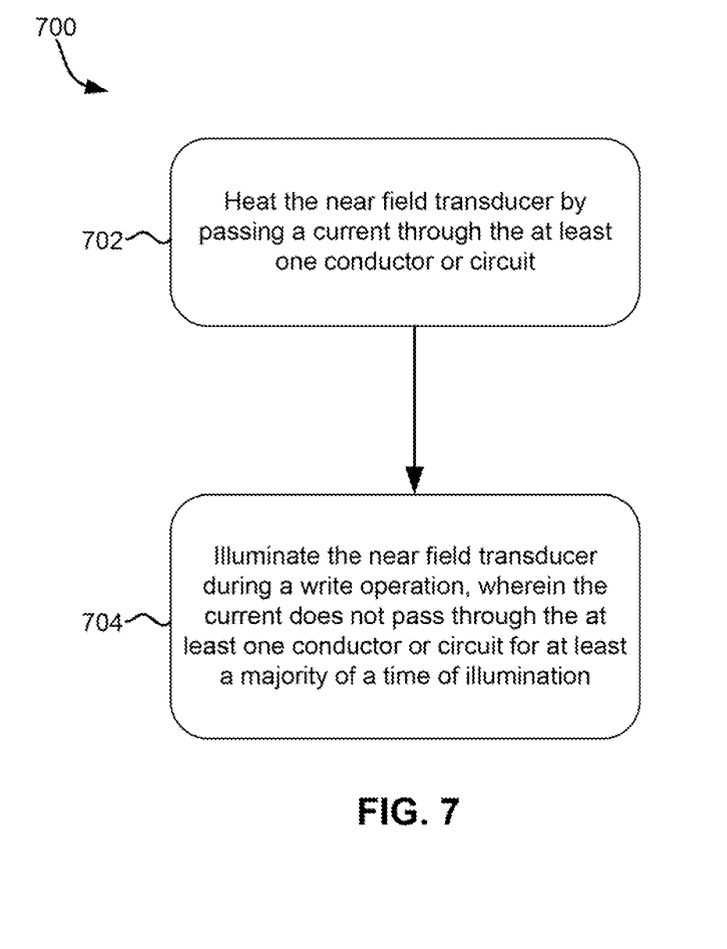
FIG. 7 depicts the process steps of a method according to one embodiment.

Referring to FIG. 7, a method 700 is described according to one embodiment. The method 700 may be carried out in any desired environment, including those described in FIGS. 1-6. In addition, any of the previously described embodiments taught and/or suggested herein may be implemented in conjunction with the method 700 described hereinafter.

In operation 702, a near-field transducer is heated by passing a current through the at least one conductor or circuit. See, e.g. FIGS. 5 and 6.

In operation 704, the near-field transducer is illuminated during a write operation, so the current does not pass through the at least one conductor or circuit for at least a majority of a time of illumination. However, in one approach, the current may not be applied when the near-field transducer is illuminated.

In another approach, the current may be applied to the at least one conductor or circuit for a portion of the time that the near-field transducer is illuminated, e.g., concurrently, gradually, etc. or any other application which would be apparent to one of skill in the art upon reading the present description. In yet another approach, the illumination may be gradually increased while the current may be gradually decreased. The increase and/or decrease may be continuous, stepped, linear, a shaped function, etc. Without wishing to be bound by any theory, it is believed that this possibly gradual switch between heat sources may be caused by a slight difference in time constants of the two heating devices.

In a preferred approach, the illumination may be increased and the current may be decreased antisymmetrically, and with the same time constant.

It should be noted that methodology presented herein for at least some of the various embodiments may be implemented, in whole or in part, in computer hardware, software, by hand, using specialty equipment, etc. and combinations thereof.

While various embodiments have been described above, it should be understood that they have been presented by way of example only, and not limitation. Thus, the breadth and scope of an embodiment of the present invention should not be limited by any of the above-described exemplary embodiments, but should be defined only in accordance with the following claims and their equivalents.

What is claimed is:

1. An apparatus, comprising:
   a near-field transducer positioned towards an air bearing surface side of the apparatus; and
   at least one conductor or circuit for causing heating of the near-field transducer; and
   a controller configured to apply the current to the at least one conductor or circuit for at least a portion of the time that the near-field transducer is not illuminated.

2. The apparatus as recited in claim 1, wherein the at least one conductor or circuit includes an electrical conductor coupled directly to the near-field transducer, wherein joule heating is generated in the near-field transducer when a current is passed therethrough.

3. The apparatus as recited in claim 2, further comprising a controller for applying the current to the at least one conductor or circuit, wherein a voltage at the near-field transducer is less than 1V.

4. The apparatus as recited in claim 2, further comprising a controller for applying the current to the at least one conductor or circuit, wherein the current is direct current.

5. The apparatus as recited in claim 2, further comprising a controller for applying the current to the at least one conductor or circuit, wherein the current is alternating current.

6. The apparatus as recited in claim 5, wherein a frequency period of the alternating current is faster than a thermal expansion time constant of the near-field transducer.

7. The apparatus as recited in claim 1, wherein the at least one conductor or circuit includes a heating element positioned closer than 400 nm to the near-field transducer.

8. The apparatus as recited in claim 7, further comprising a controller for applying the current to the at least one conductor or circuit.

9. The apparatus as recited in claim 7, wherein the heating element is recessed from the air bearing surface side.

10. The apparatus as recited in claim 1, further comprising a waveguide for illumination of the near-field transducer.

11. An apparatus comprising:
    a near-field transducer positioned towards an air bearing surface side of the apparatus;
    at least one conductor or circuit for causing heating of the near-field transducer; and
    a controller configured to apply the current to the at least one conductor or circuit for at least a majority of the time that the near-field transducer is not illuminated.

12. The apparatus as recited in claim 11, wherein the controller is configured to apply the current to the at least one conductor or circuit for a portion of the time that the near-field transducer is illuminated.

13. The apparatus as recited in claim 11, wherein the controller is configured to apply the current to the at least one conductor or circuit when a servo pattern on a magnetic medium passes by the near-field transducer.

14. The apparatus as recited in claim 1, further comprising:
    a magnetic head having the near-field transducer;
    a magnetic medium;
    a drive mechanism for passing the magnetic medium over the magnetic head; and
    a controller electrically coupled to the magnetic head for controlling operation of the magnetic head.

15. A method, comprising:
    heating a near-field transducer positioned towards an air bearing surface side of an apparatus having the near-field transducer by passing a current through at least one conductor or circuit for causing heating of the near-field transducer; and illuminating the near-field transducer during a write operation, wherein the current does not pass through the at least one conductor or circuit for at least a majority of a time of illumination.

16. The method as recited in claim 15, wherein the current is not applied when the near-field transducer is illuminated.

17. The method as recited in claim 15, wherein the current is applied to the at least one conductor or circuit for a portion of the time that the near-field transducer is illuminated.

18. The method as recited in claim 15, wherein the illumination is gradually increased while the current is gradually decreased.

19. The method as recited in claim 15, wherein the at least one conductor or circuit includes an electrical conductor coupled directly to the near-field transducer, wherein joule heating is generated in the near-field transducer when a current is passed therethrough.

20. The method as recited in claim 19, wherein a voltage at the near-field transducer is less than 1V.

21. The method as recited in claim 19, wherein the current is direct current.

22. The method as recited in claim 19, wherein the current is alternating current.

23. The method as recited in claim 22, wherein a frequency period of the alternating current is faster than a thermal expansion time constant of the near-field transducer.

24. The method as recited in claim 15, wherein the at least one conductor or circuit includes a heating element positioned closer than 400 nm to the near-field transducer.

* * * * *

UNITED STATES PATENT AND TRADEMARK OFFICE
CERTIFICATE OF CORRECTION

PATENT NO. : 8,553,506 B2  Page 1 of 1
APPLICATION NO. : 13/340147
DATED : October 8, 2013
INVENTOR(S) : Contreras et al.

It is certified that error appears in the above-identified patent and that said Letters Patent is hereby corrected as shown below:

In the specification:

col. 8, line 1 replace "die" with --the--.

Signed and Sealed this
Third Day of December, 2013

Margaret A. Focarino
*Commissioner for Patents of the United States Patent and Trademark Office*